United States Patent [19]

Sugiura

[11] Patent Number: 5,020,118

[45] Date of Patent: May 28, 1991

[54] IMAGE READING APPARATUS

[75] Inventor: Susumu Sugiura, Atsugi, Japan

[73] Assignee: Canon Kabushiki Kaisha, Tokyo, Japan

[21] Appl. No.: 220,959

[22] Filed: Jun. 21, 1988

Related U.S. Application Data

[63] Continuation of Ser. No. 742,569, Jun. 7, 1985, abandoned.

[30] Foreign Application Priority Data

| Jun. 13, 1984 | [JP] | Japan | 59-119895 |
| Jun. 21, 1984 | [JP] | Japan | 59-126331 |
| Jun. 26, 1984 | [JP] | Japan | 59-130180 |

[51] Int. Cl.⁵ .................. G06K 9/38; G06K 9/00; G01J 3/50
[52] U.S. Cl. ................... 382/50; 382/62; 358/446; 250/226
[58] Field of Search ............ 382/62, 63, 68, 50, 382/52, 54; 358/282, 284, 446, 465; 250/226, 233, 211; 357/30

[56] References Cited

U.S. PATENT DOCUMENTS

| 3,747,066 | 7/1973 | Vernot et al. | 340/146.3 |
| 3,778,768 | 12/1973 | Brisk et al. | 340/146.3 |
| 3,982,274 | 9/1976 | Chai | 358/41 |
| 4,399,461 | 8/1983 | Powell | 382/52 |
| 4,403,258 | 9/1983 | Balzan et al. | 358/284 |
| 4,412,236 | 10/1983 | Sasano et al. | 357/31 |
| 4,468,704 | 8/1984 | Stoffel et al. | 382/52 |
| 4,521,812 | 6/1985 | Knop | 358/284 |
| 4,536,803 | 8/1985 | Hennig | 358/284 |
| 4,547,074 | 10/1985 | Hinoda et al. | 356/405 |
| 4,577,235 | 3/1986 | Kannapell et al. | 382/52 |
| 4,613,948 | 9/1986 | Gharavi | 382/52 |
| 4,654,536 | 3/1987 | Saito et al. | 250/578 |
| 4,663,656 | 5/1987 | Elabd et al. | 358/75 |
| 4,701,626 | 10/1987 | Ishizaki et al. | 250/578 |
| 4,748,680 | 5/1988 | Margolin | 382/65 |
| 4,806,750 | 2/1989 | Vincent | 250/226 |

OTHER PUBLICATIONS

W. G. Barg, "An edge-enhancing double-focus carmera for image processing", *Philips Tech.*, 1977, Rev. 37, No. 7, pp. 180-187.

Primary Examiner—Leo H. Boudreau
Assistant Examiner—Michael Cammarata
Attorney, Agent, or Firm—Fitzpatrick, Cella, Harper & Scinto

[57] ABSTRACT

There is disclosed an image reading apparatus capable of preparing unsharp mask data from an image with a simple structure. For this purpose there is employed a first line sensor with plural photoelectric converting elements, and a second line sensor with larger photoelectric converting elements of a greater length, both being arranged parallel and desired data being obtained by processing the signal from these sensors.

28 Claims, 17 Drawing Sheets

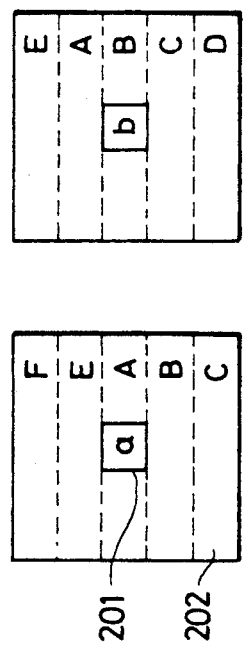
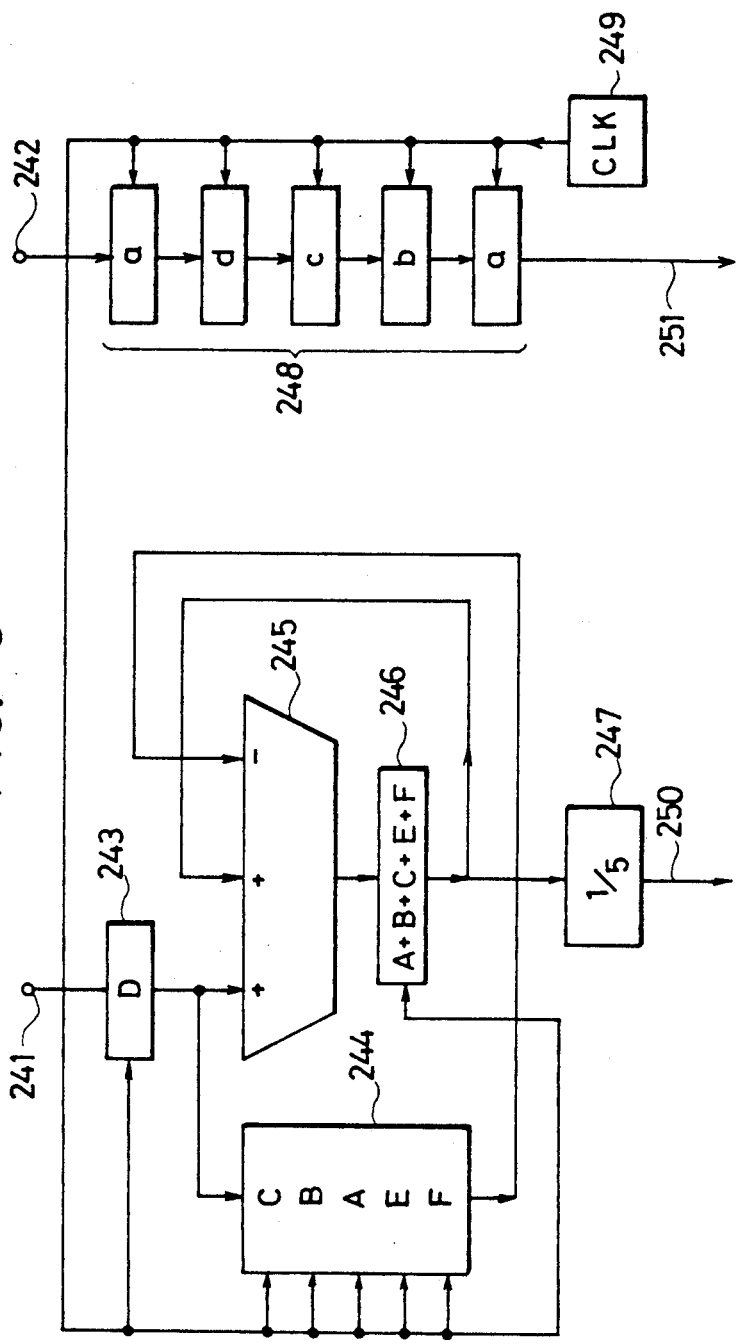
FIG. 8A FIG. 8B FIG. 8C FIG. 8D
FIG. 9

FIG. 12A  FIG. 12B
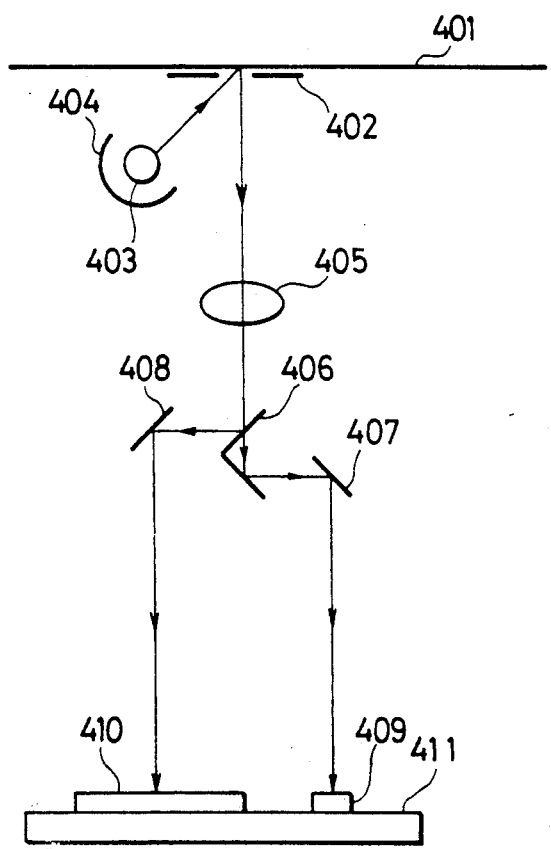
FIG. 13A
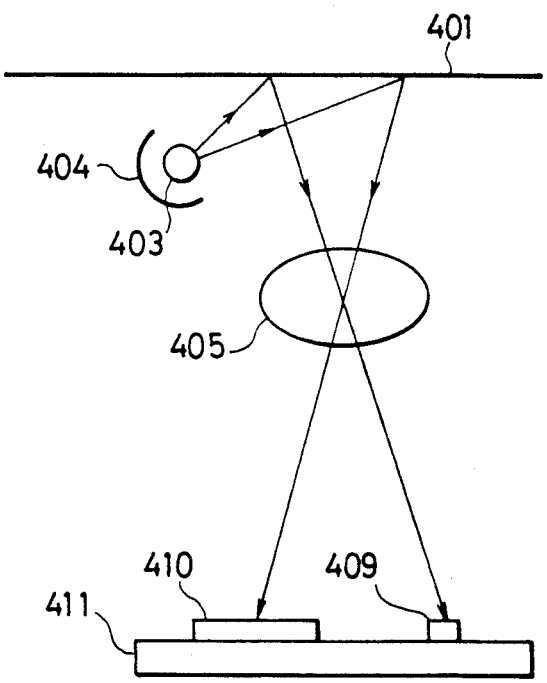
FIG. 13B

IMAGE READING APPARATUS

This application is a continuation of application Ser. No. 742,569 now abandoned filed June 7, 1985, now abandoned.

BACKGROUND OF THE INVENTION

1. Field of the Invention

The present invention relates to an image reading apparatus for photoelectrically reading an original image and forming image signals representing said original image.

2. Description of the Prior Art

There have been proposed various image processing apparatus for storage, transmission to a distant location or image recording on a printer, of image signals obtained by photoelectrically reading an original image with an image sensor such as a charge-coupled device (CCD).

In such image processing apparatus, unsharp mask data are often prepared from the original image for use, for example, in the edge enhancement of contours of characters in the original image, image discrimination for separating image areas and character areas mixedly present in the original image, or elimination of moire patterns encountered in reading halftone dot image or a fine-lined image.

In the printing field, for example, image signals and corresponding unsharp mask signals are simultaneously obtained by a mechanism shown in FIG. 1, in which an original 101 is wound around and is rotated with a drum 100. A scanned point A and the vicinity thereof of said original 101 are illuminated by the light from a light source 102, and the light reflected by the original is guided, through imaging lenses 103, 104, to photoelectric converters 105, 106. The optical systems including the lenses 103, 104 etc. are integrally moved along the rotary axis of the drum 100 to scan the original 100. A photoelectric converter 105 is placed at the focal point corresponding to the point A on the original 101, but the other photoelectric converter 106 is placed at an out-of-focus position relative to said point A or has a widened aperture in order to receive the image information of the point A and the vicinity thereof. In this manner the image signals and the corresponding unsharp signals are simultaneously obtained from the photoelectric converters 105, 106.

Though the image reading method shown in FIG. 1 allows one simultaneously to obtain the image signals and the corresponding unsharp signals on a point of an original under scanning, it is not applicable to a photoelectric converter with a linear array of photosensors, such as charge-coupled device (CCD).

The above-described optical formation of an unsharp image may be replaced by making an average of the image signals of an observed pixel and plural pixels therearound through a method (1) or (2) explained in the following:

(1) In the case of calculating image signals of n x n matrix obtained for example from a drum scanner, there will be required a buffer memory of a capacity of $(l+n-1)\times(p+n-1)$ pixels, where l is the scanning width of the image and p is the number of photosensors capable of simultaneous image reading in the image reading apparatus, as shown in FIG. 2.

The value p is equal to 1 in the case of reading only one point with a photomultiplier, for example with a drum scanner as shown in FIG. 1. In such conventional method, the capacity of the buffer memory has to be very large.

For example, in the case of reading an A4-sized original image with a photomultiplier with a resolving power of 10 lines/mm for a matrix calculation of $5\times5$ there will be required a buffer memory of $(210\text{mm}\times10 \text{lines/mm}+4)\times(1+4)=10,520$ pixels.

(2) A better unsharp image signal for each sensor element of the CCD may be obtained by forming a two-dimensional image information by storing signals from the CCD in a memory, and applying a two dimensional filtering of n x m pixels, where n and m are integers to said two-dimensional image information.

This method, however, requires multiplying and summing operations of n x m times for obtaining an unsharp image signal. As an example, in the case of filtering with $13\times13$ pixels, there are required at least 169 multiplication-solutions and one division for obtaining the average value. Consequently, even if the data accessing and said multiplication-summation can be accomplished within a microsecond, there will be required at least 169 $\mu$ sec. for obtaining an unsharp image signal for an observed pixel. Also, the image reading time has to be extended since the scanned area is enlarged for obtaining the unsharp image signal, as will be explained later.

FIG. 3 shows an example of the image reading apparatus equipped with a photosensor array, in which an image reading head 107 is provided, as an example, with five photosensor elements. An original document 109 is moved in the vertical direction in FIG. 3 by a roller 111 driven by a motor 112, while the image reading head 107 is simultaneously moved in the horizontal direction by a motor 114 through a transmission member such as a belt or wire, and the image signals from the image reading head 107 are released after suitable processing in a data preparation unit 115.

FIG. 4(A) shows the scanning state in a single scanning motion of the image reading head 107 in the arrangement shown in FIG. 3 and the scanning area required for preparing the unsharp image signal with said image reading head 107. A photosensor array 116 of the image reading head 107 has five sensor elements a1-a5 linearly arranged in the subsidiary or secondary scanning direction and is moved from left to right in the main scanning direction to scan the original document 109. An image area 117 is read by the photosensor array 116 in one scanning motion, while an image area 118 is required for preparing unsharp image signals for the pixels contained in the image area 117.

FIG. 4(B) illustrates an example of the operation of forming an unsharp mask signal with said photosensor array 116. An unsharp mask signal b1 for a pixel a1 is for example obtained from the following equation:

$$b1 = \frac{1}{25}\left(\sum_{i=1}^{22} P_i C_i + \sum_{j=1}^{3} a_j C_j\right) \quad (1)$$

wherein $C_i$ and $C_j$ are filtering coefficients for preparing unsharp mask signals.

Though a single scanning motion of the photosensor array 116 only provides data in an image area 117 indicated by A1, A2, A3 and A4, the calculation according to the equation (1) also requires image data P1-P10 positioned outside said image area. Thus, said calculation cannot be accomplished with the data of a single scanning of the photosensor array 116 but requires the data of the preceding scanning line as well. Similarly, for obtaining an unsharp mask signal for a pixel a5 at the right lower corner of the image area 117, there are required the image data of an area indicated by Q1, Q2, Q3 and Q4, including image data of the succeeding scanning line and those of a right-hand margin area.

The above-explained example shows a case of calculating the unsharp mask signal with 5×5 pixels, but in practice filtering with as many as 13×13 pixels may be used in order to prevent or detect moire patterns generated in the case that the original image 109 is a screen-tone dot image.

In the above-described method, there is required a memory of a capacity substantially corresponding to the image area 118 surrounded by R1, R2, R3 and R4 in FIG. 4(A) for unsharp image signal preparation, and the calculation of the unsharp image signals of the pixels in the image 117 of a scanning line indicated by A1, A2, A3 and A4 in FIGS. 4(A) and 4(B) is made possible only after the sensor array 116 has read three scanning lines.

As explained in the foregoing, the conventional method for obtaining unsharp mask signals with a linear sensor such as CCD has been associated with the drawbacks of:

(1) requiring an extremely large memory capacity;
(2) requiring a very long calculating time for obtaining the unsharp mask signals;
(3) requiring a long image reading time, since the unsharp mask signals can be obtained only after the scanning is made wider than the effective image area in the vertical and horizontal directions; and
(4) requiring complex control means since the image area required for preparing unsharp mask signals is different from the image area required for obtaining image signals.

Also, the discrimination of an image has been made by storing two-dimensional image information, obtained with an image sensor from an original image, in a memory and calculating the average value or frequency distribution of a particular area on said memory.

Such process requires a memory of a large capacity for storing the image information form the original image, and a high-speed processing is required in case the input and output are connected on real-time basis. For these reasons such image reading apparatus has been associated with a difficulty in the circuit structure as well as in the magnitude of the circuitry.

SUMMARY OF THE INVENTION

In consideration of the foregoing, an object of the present invention is to provide an image reading apparatus capable of providing unsharp mask data with a simple structure.

Another object of the present invention is to provide an image reading apparatus suitable for preparing unsharp mask information corresponding to the information of an observed pixel in a sensor array containing plural photoelectric converting elements, without a buffer memory of elevated capacity and with an inexpensive simple structure precluding loss in time.

Still another object of the present invention is to provide an image reading apparatus capable of providing the image information of an observed pixel and the unsharp mask information around said pixel at the same time on a real-time basis.

Still another object of the present invention is to provide an image reading apparatus with a simple circuit structure, capable of discriminating the content of an image even with a sufficiently low processing speed of the control circuit for data processing.

Still another object of the present invention is to provide an image reading apparatus adapted for reading a color image.

Still another object of the present invention is to provide an image reading apparatus capable of two-dimensional filtering at high speed and in a simple manner.

The foregoing and still other objects of the present invention, and the advantages thereof, will become fully apparent from the following description.

BRIEF DESCRIPTION OF THE DRAWINGS

FIGS. 8(A), 8(B), 8(C) and 8(D) are schematic views showing the function of the processing unit shown in FIG. 7;

FIG. 9 is a block diagram showing another embodiment of the processing unit;

FIGS. 12(A) and 12(B) are charts showing examples of a threshold value pattern to be selected by a pattern generator shown in FIG. 11;

FIGS. 13(A) and 13(B) are elevation views showing other embodiments of the optical system of the image reading apparatus;

DETAILED DESCRIPTION OF THE PREFERRED EMBODIMENTS

Now the present invention will be clarified in detail by the following detailed description of the preferred embodiments thereof shown in the attached drawings.

Figure 5:
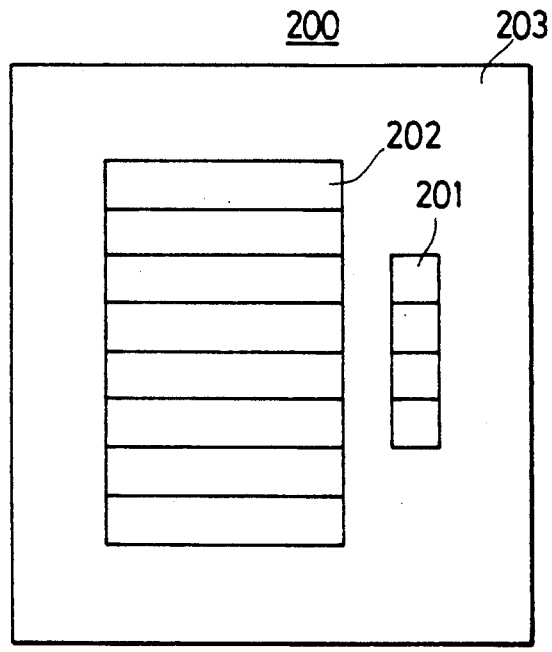
FIG. 5 is a plan view showing an example of a sensor constituting an essential part in the present invention.

FIG. 5 shows an embodiment of the image reading sensor according to the present invention. In the embodiment to be explained in the following it is assumed that the image reading sensor for obtaining image information consists of an array of four photosensor elements, and that an average signal is prepared in an area of 5×5 pixels around an observed pixel detected by array. In FIG. 5 there are shown a photosensor array 201 for obtaining image information for each pixel, and an array 202 of larger photosensor elements for obtaining the average signal. The latter array 202 is five times longer, in each photosensor element, than the former array 201, and is composed of 8 elements for obtaining the average signal over an area of 5×5 as explained above.

Consequently the area ratio of each photosensor element in array 201 to that in said array 202 is equal to 1 : 5. The arrays 201, 202 are both formed on the same substrate 203, with mutual alignment.

Figure 6:
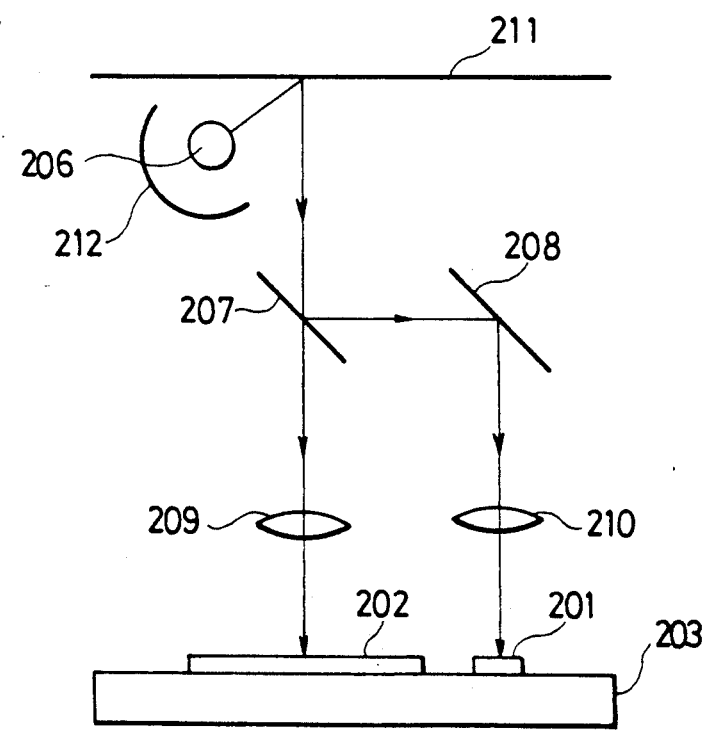
FIG. 6 is a schematic elevation view showing an embodiment of the image reading apparatus utilizing the sensor shown in FIG. 5.

FIG. 6 shows an embodiment of the image reading mechanism utilizing the image reading sensor 200 shown in FIG. 5, wherein are illustrated an original document 211; a reflector 212 for a light source 206 illuminating said original 211; a half mirror 207 placed in the reflected light path from the original 211; a mirror 208 for deflecting the light reflected by said half mirror 207 and lenses 209, 210 constituting an imaging optical system.

The light reflected by the original 211 and transmitted by the half mirror 207 is focused by an imaging lens 209 and is received by the array 202 of larger photosensor elements for preparing the average signal or unsharp mask signals. On the other hand, the light reflected by the half mirror 207 is deflected by the mirror 208, then focused by the other lens 210 and is received by the array 201 for obtaining image information for each pixel.

Figure 7:
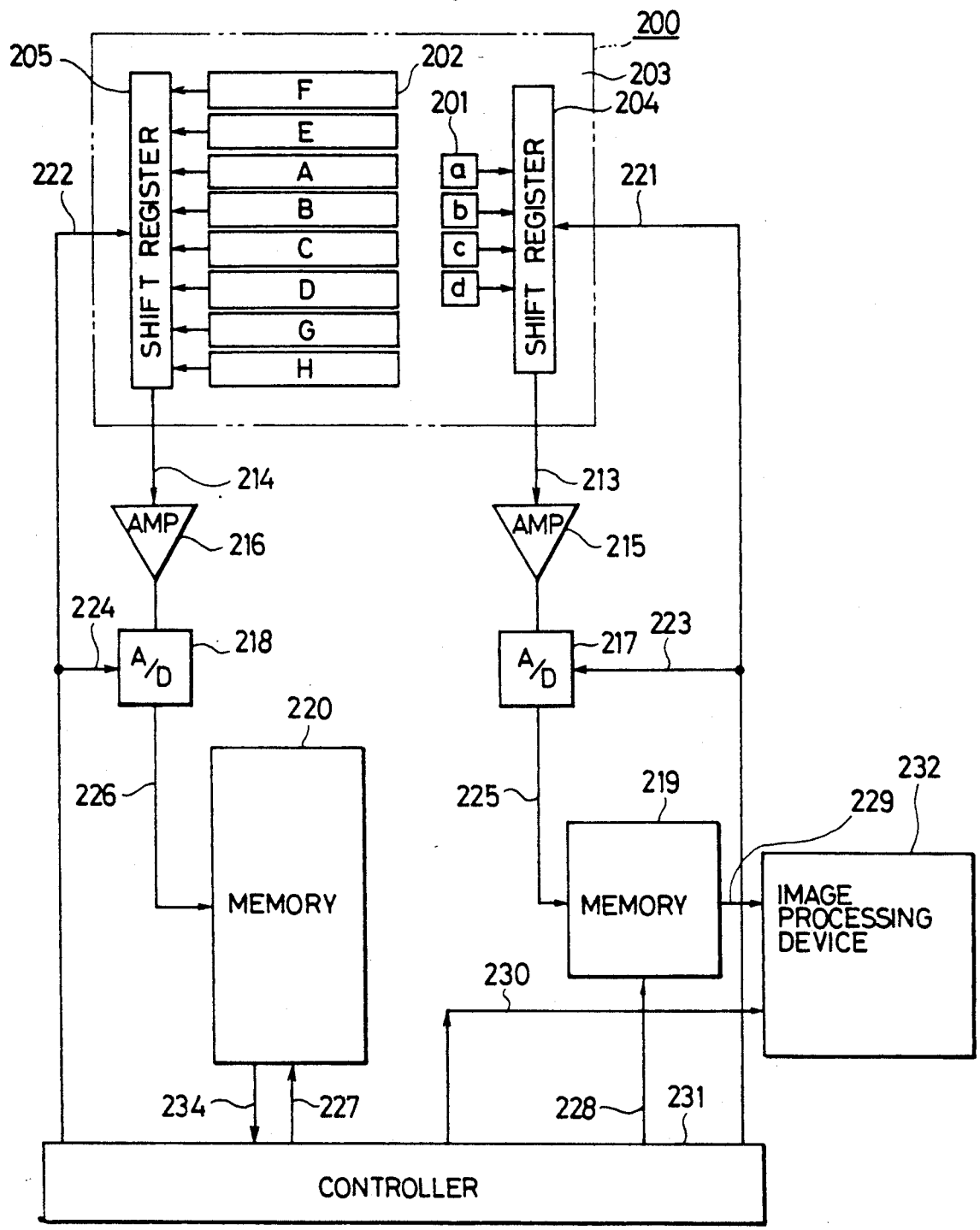
FIG. 7 is a block diagram showing an embodiment of a processing unit for processing the output of the sensor shown in FIG. 5.

FIG. 7 shows an embodiment of the external circuit to be connected to the image reading sensor shown in FIG. 5 for obtaining the average value of the pixels surrounding an observed pixel. There are provided shift registers 204, 205 performing shift operations respectively in response to clock signals 221, 222 from a controller 231, and the output signal from the pixel information detecting sensor array 201 and the larger photosensor array 202 for obtaining the unsharp mask signals are temporarily stored respectively in said shift registers 204, 205. The image information or video signals from said shift registers are respectively supplied through output lines 213, 214, amplified in pre-amplifiers 215, 216 and supplied to analog-to-digital (A/D) converters 217, 218. The information converted in said A/D converters 217, 218 in response to clock signals 223, 224 synchronized with the aforementioned clock signals 221, 222 is stored, through signal lines 225, 226, in memories 219, 220, respectively, at addresses designated by the controller 231.

In normal operation, the signals of four elements a, b, c, d of the array 201 and those of eight elements F, E, A, B, C, D, G, H of the array 202 are stored in sequential addresses in the memories 219, 220. Consequently, the image information of each pixel can be obtained by reading the signals stored in the memory 219 in the conventional manner. Also the unsharp mask signal, for example for the element a of the array 201, can be obtained as the average of the signals of the elements F, E, A, B, C of the array 202, by summing said signals and multiplying said sum by 1/5, as shown in FIG. 8(A).

Similarly the average value for the element b of the array 201 can be obtained by a calculation $1/5 \times (E+A+B+C+D)$ as shown in FIG. 8(B). The calculations can be accomplished by reading the data from the memory 220 through an output line 234 according to addresses designated by the controller 231 through an address line 227, and summing said data and multiplying said sum by 1/5 in a microprocessor (CPU) in the controller 231. The result of said calculation is supplied to an image processing unit 232 through a data line 230. In contrast to the foregoing embodiment in which the calculation is effected in a CPU in the controller 231, FIG. 9 shows another embodiment in which said calculation is achieved in a hardware structure, in which input terminals 241, 242 are respectively connected to the output lines 226, 225 of the A/D converters 218, 217 shown in FIG. 7. The output signals from said A/D converters 218, 217 are latched by latch circuits 234, 248 functioning in response to clock signals from a clock generator 249. There are also provided a first-in-first-out (FIFO) resister 244 for storing the output signals of the register 243; an adder-subtractor 245; an accumulator 246; and a table converter 247 for multiplying 1/5 by the output of said accumulator 246.

Said latch circuit 248 is composed of a shift register for synchronizing the image information of an observed pixel with the average value signal thereof. An output line 250 of the table converter 247 provides the average signals while an output line 251 of the latch circuit 248 provides the image signals, both mutually synchronized by clock signals.

FIG. 9 shows a state in which the image signal of the pixel a is given at the output line 251 while the corresponding average signal of 5×5 pixels is given to the output line 250, and the characters indicated in the registers 243, 244, 248 indicate the data respectively corresponding to the photosensor elements.

Figure 10:
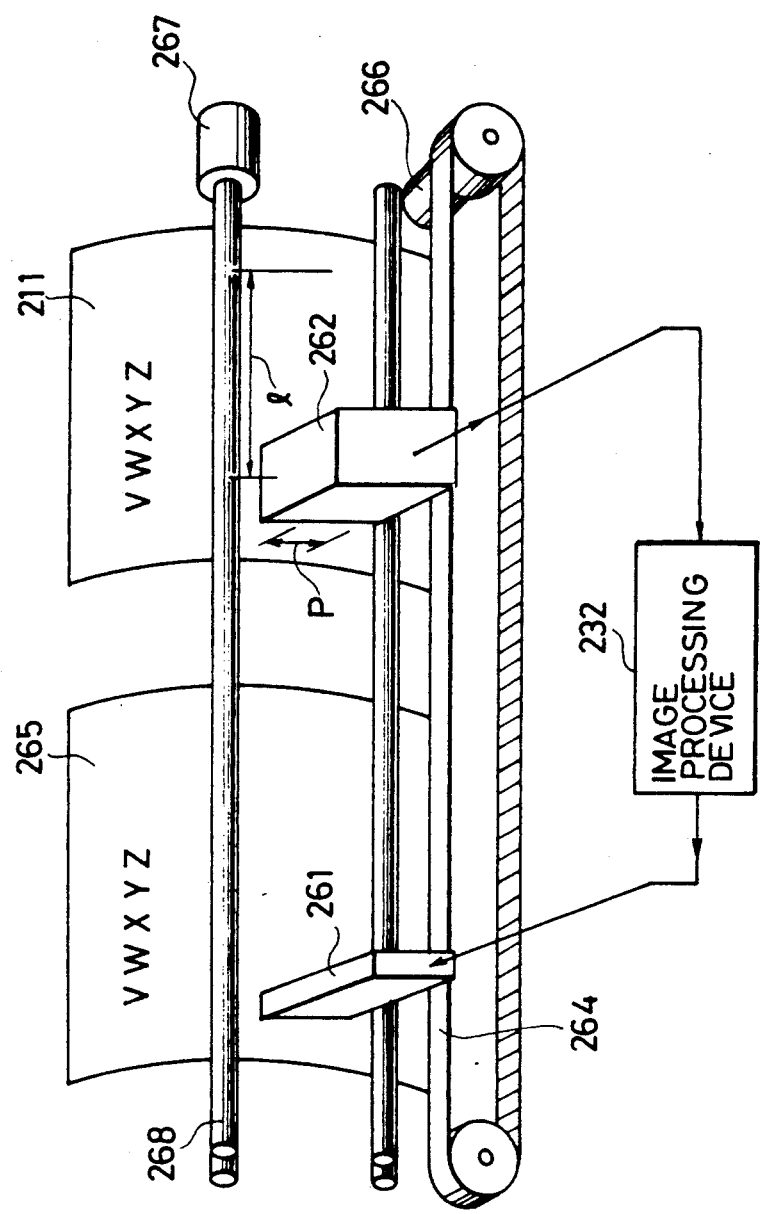
FIG. 10 is a perspective view showing a copier constructed with the apparatus of the present invention.

FIG. 10 shows an embodiment of a copier constructed with the image reading apparatus explained above in relation to FIGS. 5 to 9. There are shown a recording head 261, for example composed of a 4-nozzle ink jet recording head utilizing the known bubble jet process as disclosed in the Television Gakkai Shi, Vol. 137, No. 2 (1983), p. 118-123, and an image reading apparatus 262 of the present invention, incorporating a sensor array 201 with four photosensor elements with a pitch and a pixel area the same as those of the recording head 261.

Figure 1:
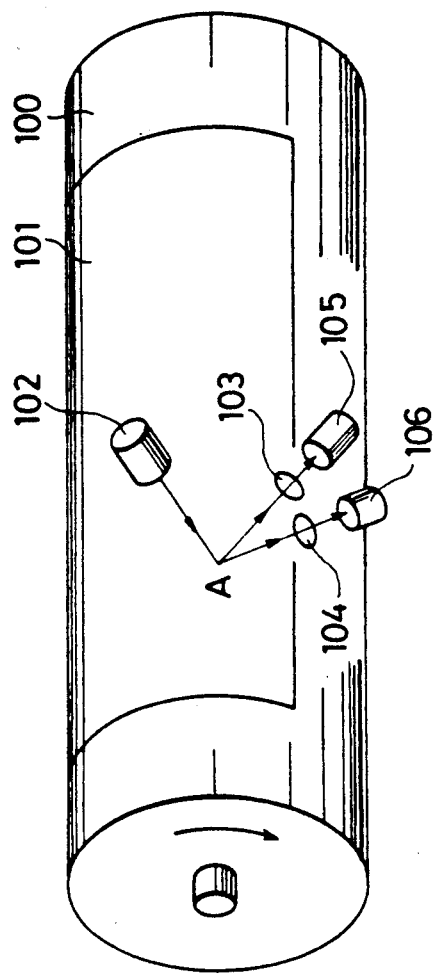
FIG. 1 is a perspective view showing an example of conventional image reading apparatus.
Figure 2:
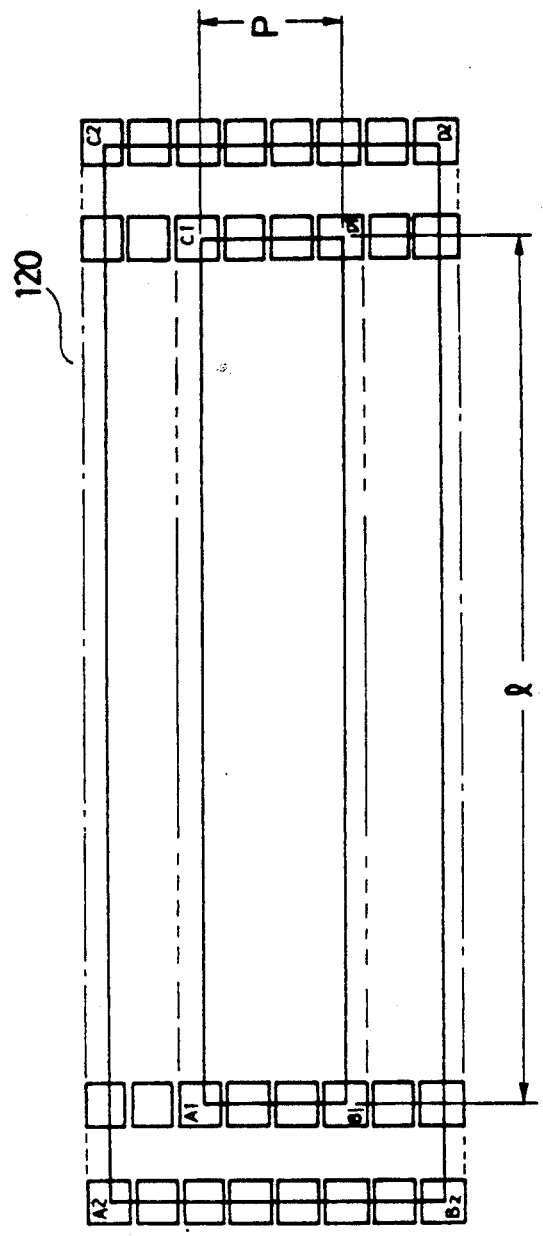
FIG. 2 is a plan view showing the content of memory for a conventional process.
Figure 3:
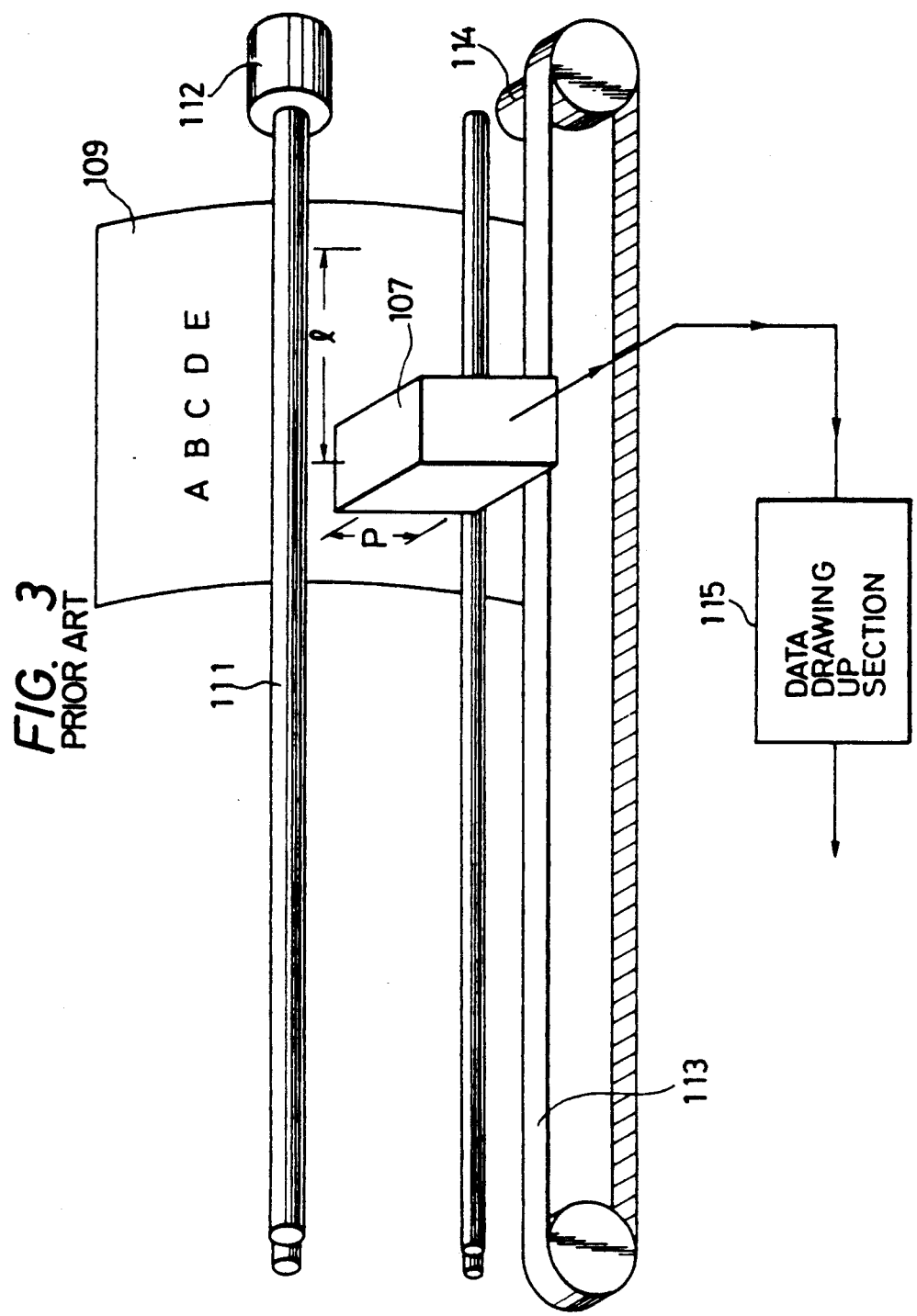
FIG. 3 is a perspective view showing another example of conventional image reading apparatus.
Figure 4A:
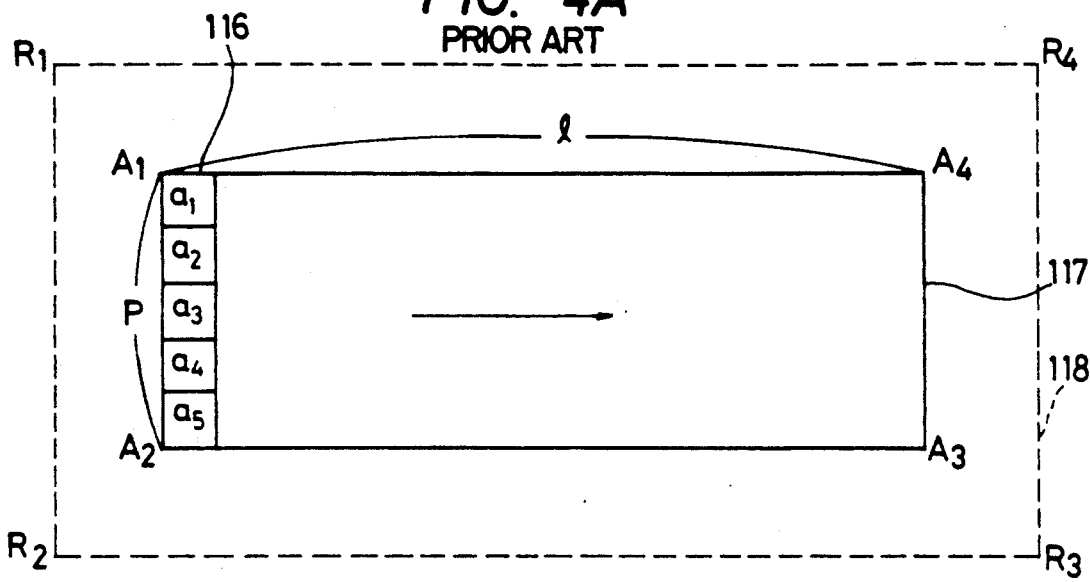
FIGS. 4 (A) and 4 (B) are plan views showing a conventional method for preparing unsharp mask signals.
Figure 4B:
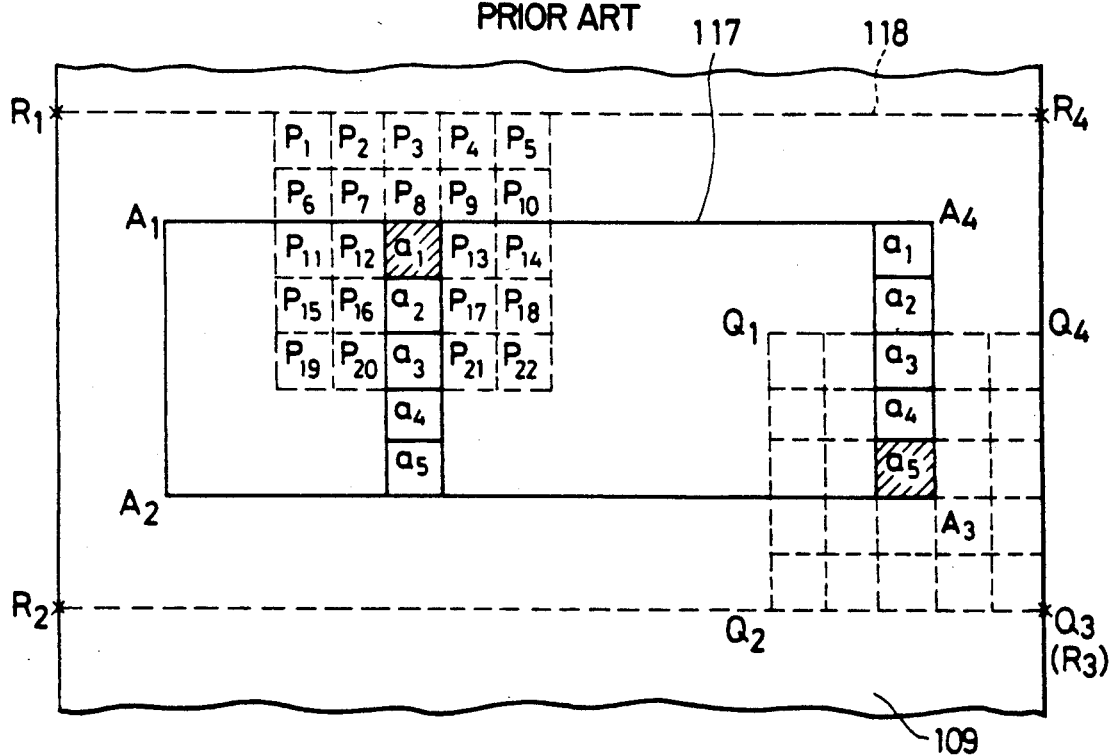

In order to effect edge enhancement or separation of image areas for improving the image quality in such copier, there is required a comparison of the image information of each pixel with the unsharp mask information in the surrounding area of said pixel. For this purpose, there has conventionally been required a buffer memory 120 with a capacity p x l, wherein l is the number of photosensor elements in the array and l is effective scanning width of the origianl 211, as illustrated in FIG. 2. Said capacity becomes larger with the increase in number of the nozzles in the recording head, thus raising the production cost of the apparatus. Also, the information to be printed can only be determined after the scanning operation for image reading has been completed, so that the recording of a line requires two scanning operations, thus giving rise to a doubled printing time. In addition the calculation of average signals for p pixels with an n x n matrix there is required a memory of a capacity of $(n+p-1) \times (n+l-1)$ with two or three scanning operations in the image reading apparatus, leading to a further prolonged printing time.

However the image reading apparatus 262 as shown in FIG. 10 can be mounted on a synchronizing belt 264 for the recording head 261 since the image reading apparatus 262 and the recording head 261 can be operated in mutually synchronous manner. Besides, as already explained in relation to FIGS. 7 and 9, the image reading apparatus 262 enables one to obtain the image information of each pixel and the unsharp mask information around said pixel on a real-time basis, thus significantly reducing the capacity of the buffer memory and avoiding the loss in printing time.

In FIG. 10 there are further shown a recording sheet 265; an image processing unit 232 for converting the image information from the image reading apparatus 262 into dot pattern data for printing; a motor 266 for simultaneously driving the image reading apparatus 262 and the recording head 261 through the synchronous belt 264; and a motor 267 for simultaneously driving the original 211 and the recording sheet 265 through a roller 268.

The image reading apparatus can naturally be applied to a color image by suitably incorporating color separation filters into the optical systems. The foregoing embodiment has been constructed with four photosensor elements for obtaining image information for each element and for obtaining average value in a 5×5 pixel matrix, but the number of said photosensor elements and the size of said matrix can naturally be modified in arbitrary manner.

As explained in the foregoing, the image reading apparatus allows one to simultaneously obtain the image information for each pixel and the unsharp mask information in an area around said pixel on real-time basis, thus providing the advantages of significantly reducing the capacity of the buffer memory, eliminating time loss in the printing, and a much simpler structure.

In the foregoing embodiment, the original image reading is achieved by moving the reading head with respect to the original image, but it is also possible to fix the reading head and move the original image alone.

In the following there will be explained an application of the image reading apparatus explained above.

Figure 11:
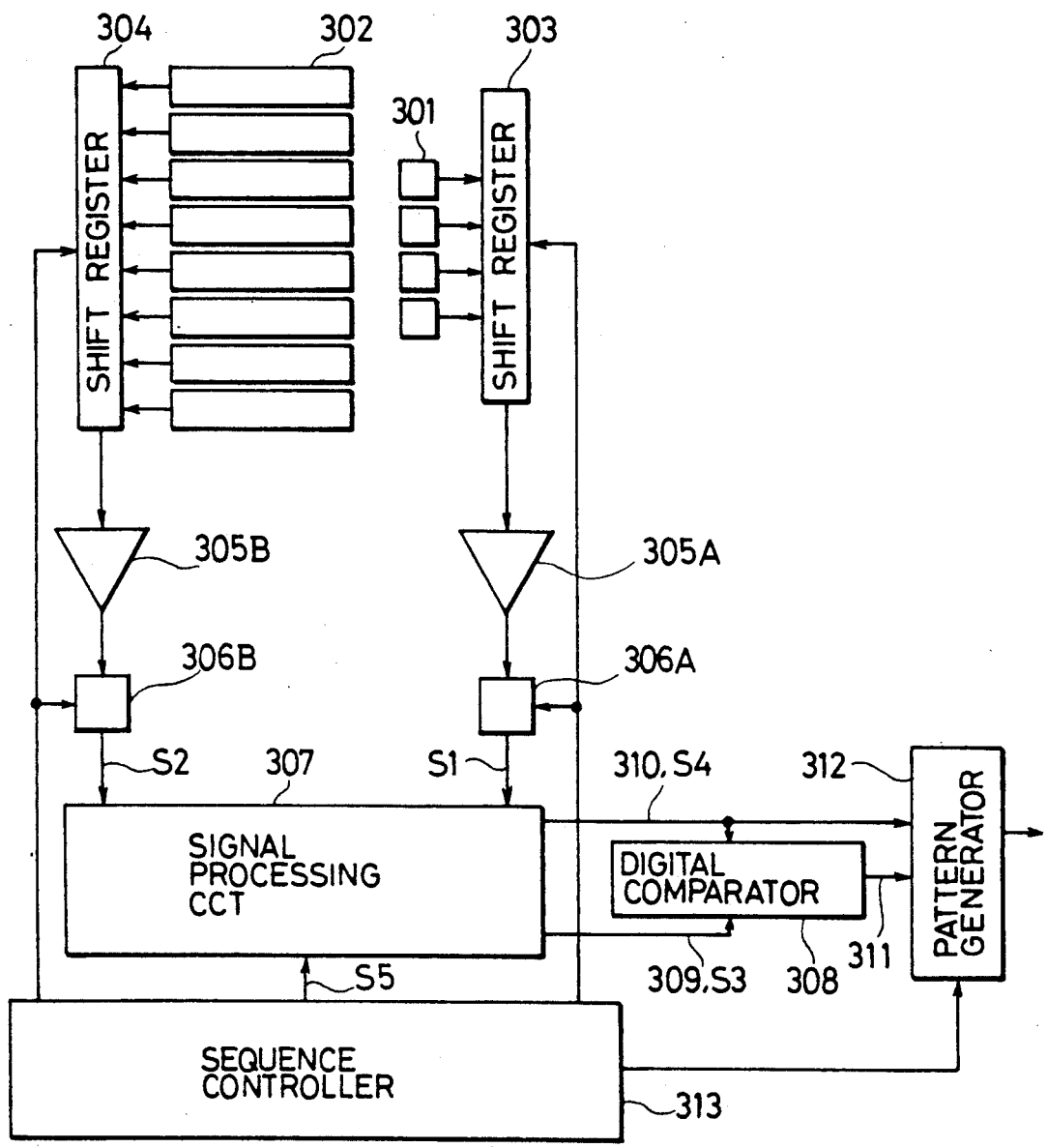
FIG. 11 is a block diagram showing still another embodiment of the processing unit for processing the output of the sensor shown in FIG. 5.

FIG. 11 shows an apparatus which discriminates the content of image from the information obtained from photosensor arrays 301, 302 in a manner as shown in FIG. 6, and prepares binary signals by switching threshold values according to the result of said discrimination and supplies said signals to an output unit such as binary signal recording unit.

There are provided shift registers 303, 304 for respectively transferring the image signals from the photosensor arrays 301, 302. The output signals from said shift register 303 are amplified in an image signal amplifier 305A and converted, in an A/D converter 306A, into digital signals S1 which are supplied to a signal processing circuit 307. On the other hand, the output signals from the shift register 304 are amplified in an image signal amplifier 305B and converted, in an A/D converter 306B, into digital signals S2 which are supplied to a signal processing circuit 307.

The signal processing circuit 307, having a structure as shown in FIG. 9, generates an average image signal S3 corresponding to the average density of pixels surrounding an observed pixel and utilized as a reference signal for image discrimination, and delays the release of an image signal S4 corresponding to the density of said observed pixel read by the photosensor array 301 and utilized for obtaining the binary signal, thus synchronizing said signals S3 and S4.

A digital comparator 308 receives the average image signal S3 through a signal line 309 and the image signal S4 through a signal line 310, both from the signal processing circuit 307, compares said signals S3 and S4 and provides the result of said comparison through an output signal line 311 to a pattern generator 312.

In a character area usually composed of black characters on a white background, the difference between the levels of the average image signal S3 and the image signal S4, or the difference between the density of the observed pixel and the average density of the surrounding pixels, becomes large, so that the digital comparator 308 releases, for example, an H-level output signal. On the other hand, in a picture area of the original, where the image density is uniform or shows only a gradual change over a relatively large area, the average image signal S3 and the image signal S4 have comparable levels, whereby the digital comparator 308 releases, for example, an L-level output signal.

In a character area of the original where the average image signal S3 and the image signal S4 have a large level difference, the image quality is deteriorated as the characters are split by the dither process if it is employed. Consequently, when the H-level output signal is obtained from the digital comparator 308, the resolving power of the reproduced image is maintained higher by data processing with a constant threshold value instead of the dither process.

Thus, the pattern generator 312 selects a dither pattern as shown in FIG. 12(A) in response to an L-level output signal from the digital comparator 308, or a constant threshold value as shown in FIG. 12(B) in response to an H-level output signal. The pattern generator 312 is further provided with a comparator for comparing the image signal S4 with a selected pattern. In this manner the pattern generator 312 selects either pattern, then binary digitizes the image signal S4 according to thus selected pattern as the threshold value, and supplies thus binary digitized signal to a following unit.

A sequence controller 313 supplies clock signals to the shift registers 303, 304, signal processing circuit 307, pattern generator 312, etc., to control these units in synchronization with said clock signals.

The above-described image discrimination on a real-time basis avoids the use of a buffer memory of a large capacity and enables practically effective data processing with a simple circuit structure, without the use of a high-speed control unit in the image discrimination.

In the foregoing there have been explained embodiments in which the output signals of photosensor elements are merely averaged for obtaining the average image density around an observed pixel. In the following there will be explained an embodiment in which unsharp image signals are obtained with two-dimensional filtering instead of mere averaging. This embodiment is applicable also to a color image.

FIGS. 13(A) and 13[B] show embodiments of the optical system for the image reading apparatus of the present invention. In FIG. 13(A) there is shown a table 401 for supporting the original image. An apertured member 402 of an area larger than the mask area required for preparation of the unsharp mask signals is positioned close to the original supporting table 401, thus avoiding mutual interference of the images focused on an imaging sensor array 409 and an unsharp mask signal forming photosensor array 409 to be explained later.

A light source 403 and a reflector 404 illuminates the original supported on the original table 401, and the light reflected therefrom is guided through an imaging lens 405 to a half mirror 406 The light transmitted by said half mirror 406 is deflected by a mirror 407 and is focused onto a photosensor array 409 formed on a common substrate 411. The light reflected by said half mirror 406 is deflected to a mirror 408 and is focused on an unsharp mask signal forming photosensor array 410 on said common substrate 411. Said unsharp mask signal forming photosensor array 410 has a light-receiving area larger than that of the photosensor array 409.

FIG. 13(B) shows another structure not containing the mirrors 406–408.

Figure 14:
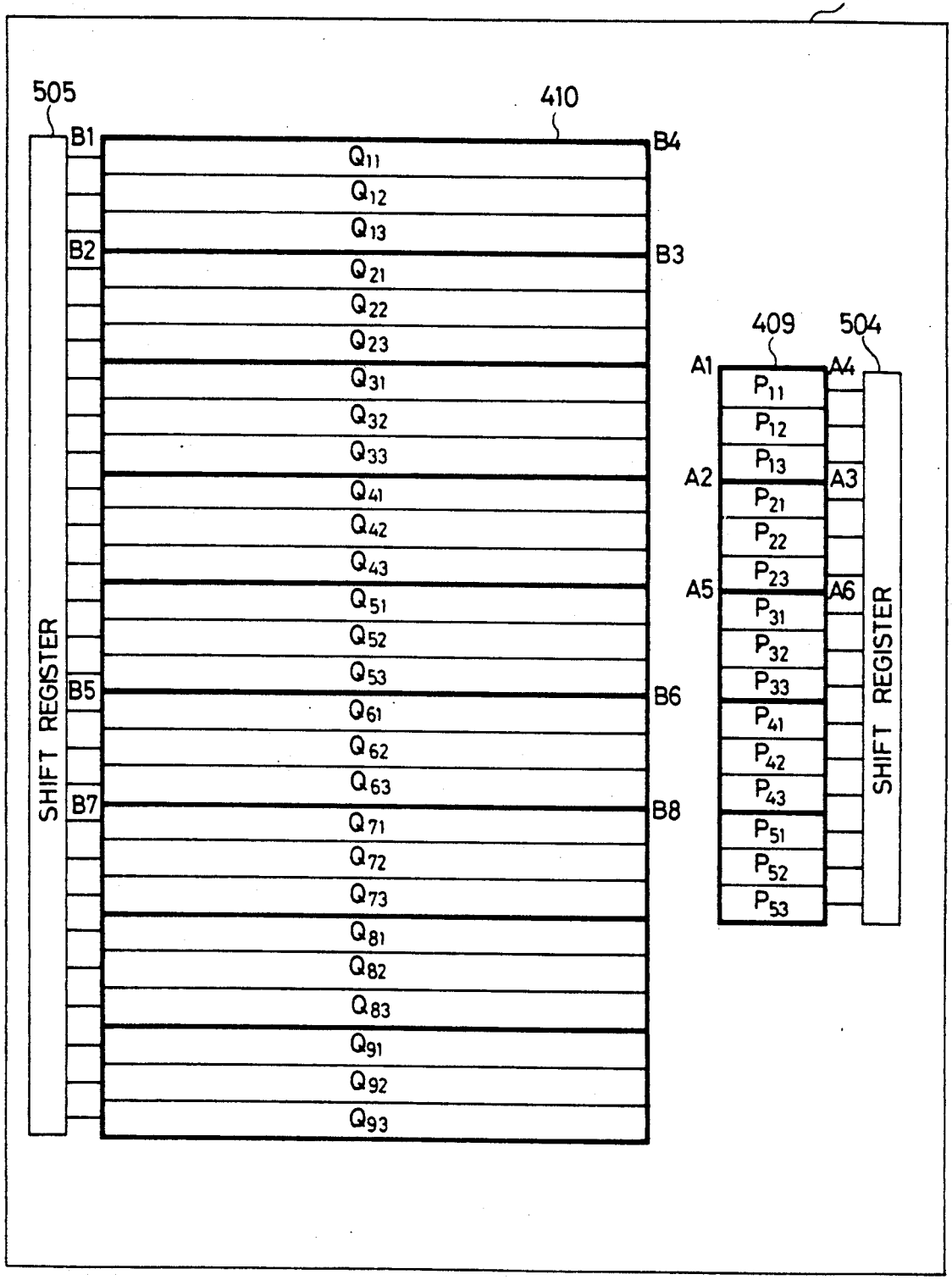
FIGS. 14, 16 and 17 are plan views showing the relationship between the arrangement of sensor shown in FIG. 13 and the filter characteristics.

FIG. 14 shows an example of the detailed structure of the sensor arrays 409, 410 shown in FIGS. 13(A) and 13(B). In the present example an unsharp mask signal is obtained from 5×5 pixels. The photosensor arrays 409, 410 formed on the same substrate 411 respectively form image signals and unsharp mask signals, also functioning as color separation signals for color printing. Shift registers 504, 505 respectively for the photosensor arrays 409, 410 are also formed on said substrate 411. In the codes $P_{ij}$ (i=1–5, j=1–3) and $Q_{ij}$ (i=1–9, j=1–3) for each element, i indicate the number of each element and j represents a color, for example red, green and blue respectively for j=1, 2 and 3.

The photosensor elements of the sensor array 409 constitute a pixel indicated by A1, A2, A3 and A4, in which three colors are separated. Also, the photosensor elements of the sensor array 410 constitute a pixel indicated by B1, B2, B3 and B4, in which three colors are separated. The length from B1 to B4 of each photosensor element in the unsharp mask signal forming array 410 is five times larger, for forming the unsharp mask signal with a 5×5 matrix, than the length from A1 to A4 of each element in the photosensor array 409.

The centers of the optical axes shown in FIGS. 13(A) and 13(B) fall respectively on the center between B1 and B4 and between A1 and A4 shown in FIG. 14. Consequently the unsharp mask signal corresponding to the image in an area indicated by A1, A2, A3 and A4 is formed by the photosensors in an area defined by B1, B5, B6 and B4, and the unsharp mask signal corresponding to the image in an area indicated by A2, A5, A6 and A3 is formed by the photosensors in an area defined by B2, B7, B8 and B3.

The unsharp mask signal is prepared by multiplying each pixel signal with a predetermined filtering factor and averaging the sum of thus multiplied pixels signals, as shown in the foregoing equation (1). For accomplishing the above-explained calculation, the two-dimensional averaging filter S(x, y) is divided into a positional function m(x) along the x-axis (the horizontal direction in the illustration) and another positional function n(y) along the y-axis (the vertical direction in the illustration). Thus, said filter S(X, y) is given by the following equation (2):

$$S(x, y) = m(x)n(y) \quad (2)$$

In the present embodiment there are employed a transmission density filter in which the transmission rate is variable according to said positional function m(x) along the x-axis, and a conversion table for multiplying filtering factors according to the positional function n(y) along the y-axis, and the two-dimensional filtering is achieved in a high-speed and inexpensive manner by conducting the filtering along the x-axis with the elongated sensor array 410 and said variable transmission density filter and the filtering along the y-axis in the conventional electrical process.

Figure 15C:
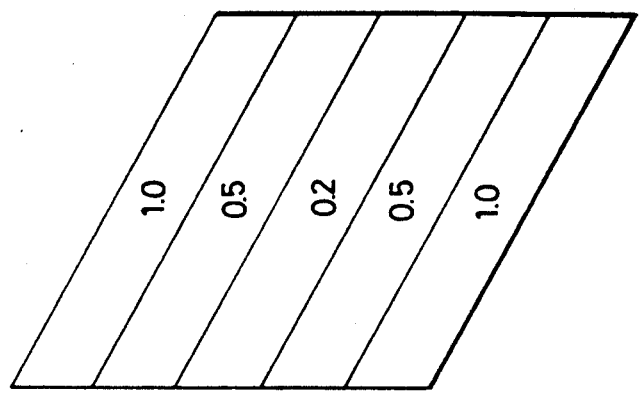
FIGS. 15(A), 15(B) and 15(C) are charts showing examples of filtering coefficients.
Figure 15A:
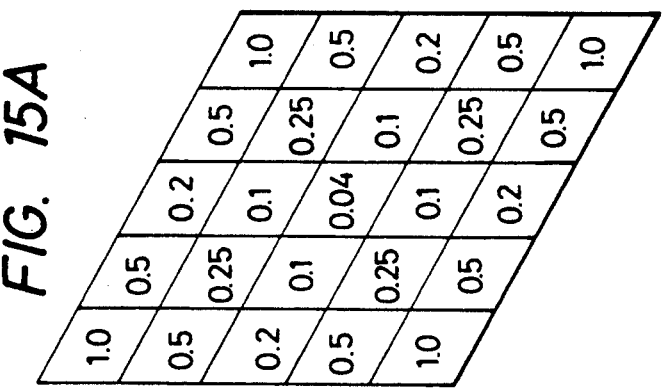
Figure 15B:
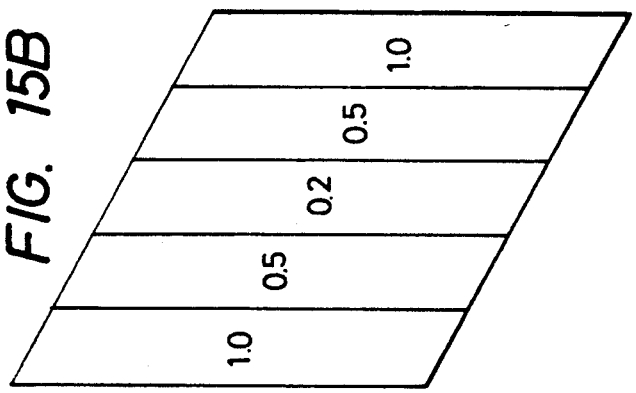

An example of the filtering factors is shown in FIGS. 15(A),(B) and (C) which respectively show two-dimensional coefficients, one-dimensional filtering coefficients along the x-axis, and one-dimensional filtering coefficients along the y-axis. The unsharp mask signal for a pixel at the center of 5×5 pixels is prepared by the mask of FIG. 15(A), but the same result can be obtained by multiplying the coefficients of the mask of FIG. 15(B) by those of the mask of FIG. 15(C). The coefficients shown in FIG. 15(B) indicate transmission densities. In the following embodiment, the filter represented by FIG. 15(A) is obtained by using a variable transmission density filter according to the coefficients in FIG. 15(B) and an electrical one-dimensional filtering according to the coefficients FIG. 15(C).

Figure 16:
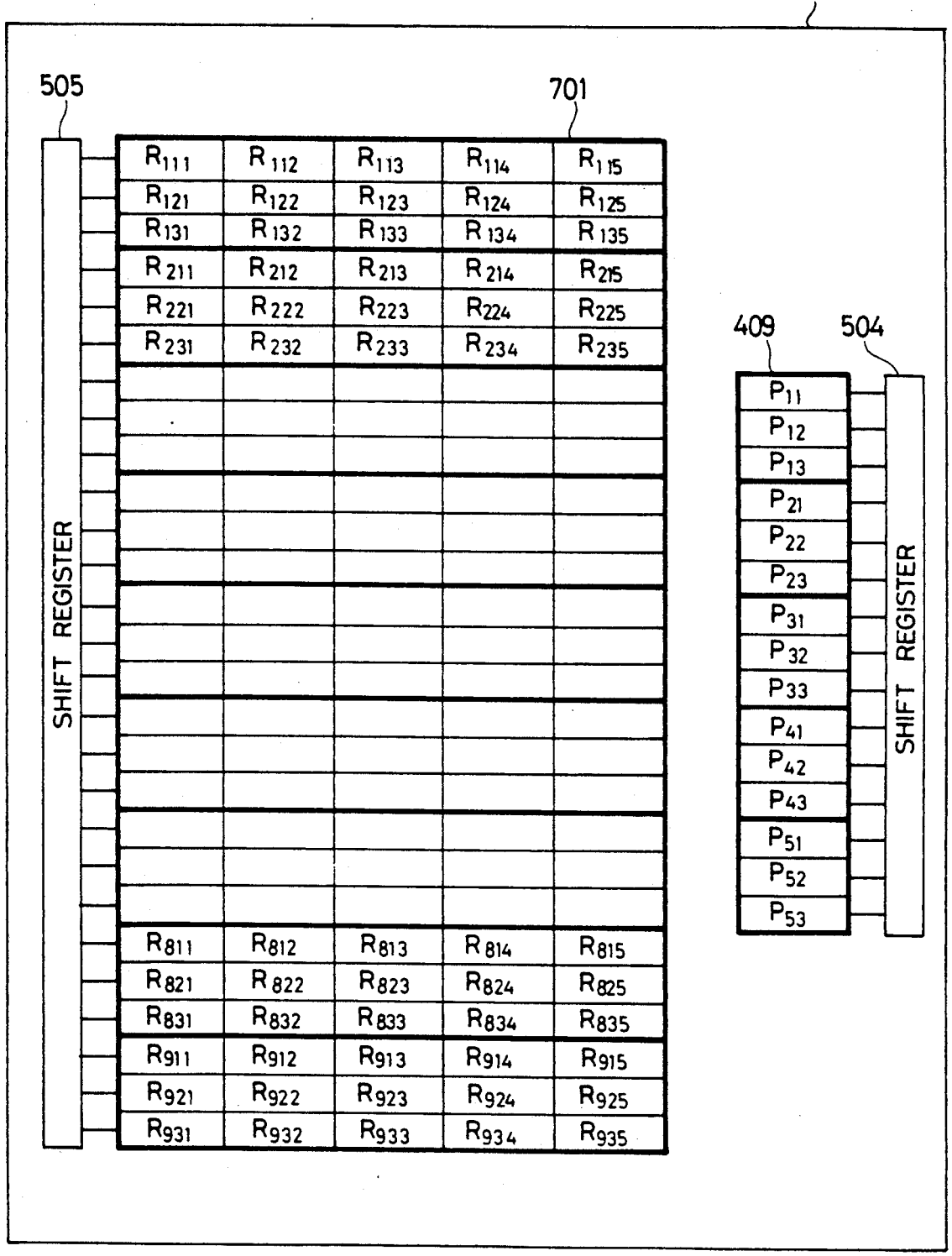

FIG. 16 shows a state with one-dimensional optical filtering by positioning a variable transmission density filter 701 in the unsharp mask signal forming sensor array 410 shown in FIG. 14. In a code $R_{ijk}$ (i=1–9, j=k–3, k=1–5) in FIG. 16, i indicates the sensor position, j indicates the color and k represents the transmission density. If the transmission density is equal to 1.0 for k=1 or k=5, the transmission density for k=2 or k=4 is equal to 0.5 and that for k=3 is equal to 0.2. The codes $P_{ij}$ are the same as shown in FIG. 14, since the variable transmission density filter is not applied on the photosensor array 409.

Figure 17:
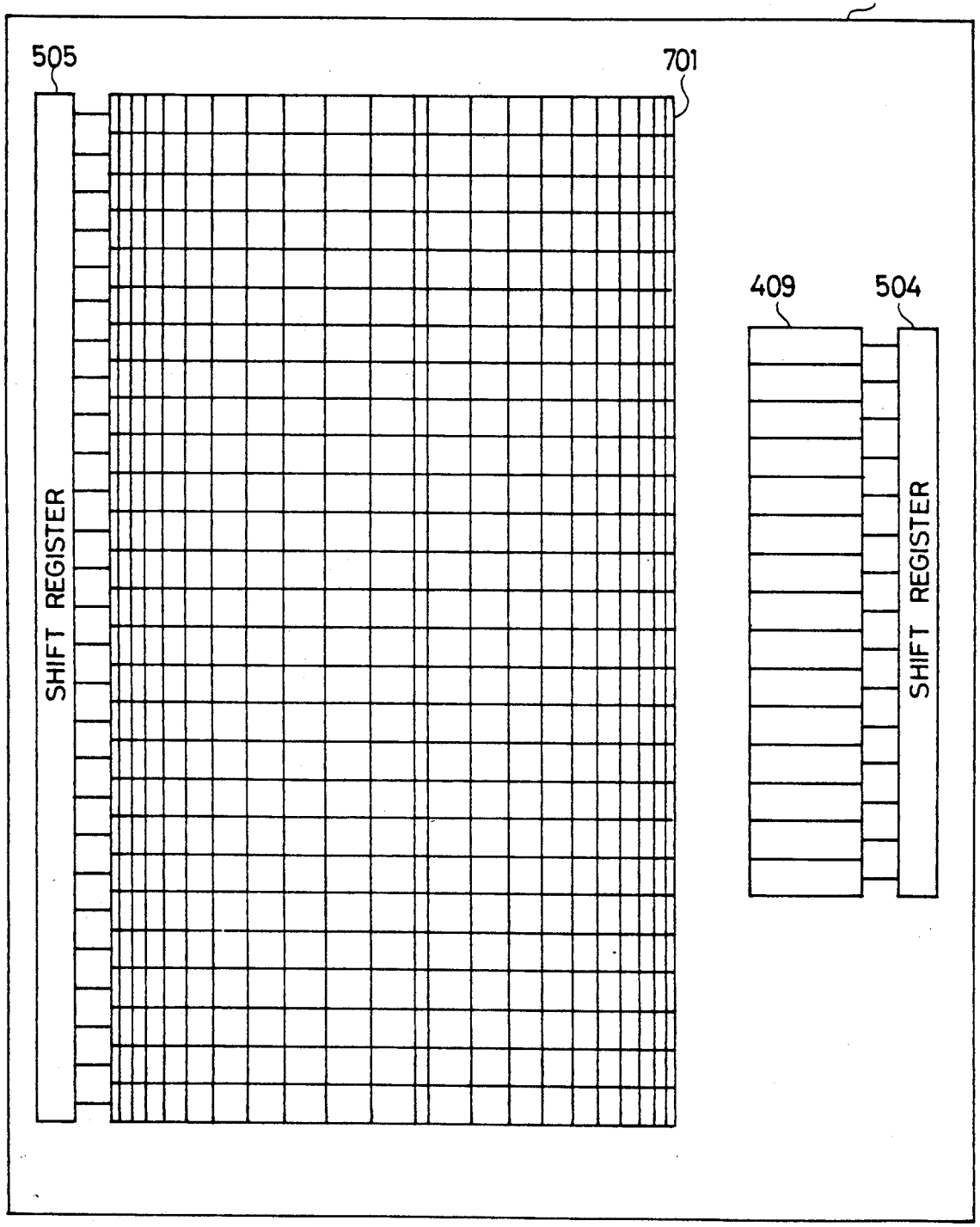

FIG. 17 shows a case employing a variable transmission density filter 701 in which the transmission density, represented by k in a $R_{ijk}$, changes in continuous manner. Other arrangements are the same as those shown in FIG. 16.

Figure 18:
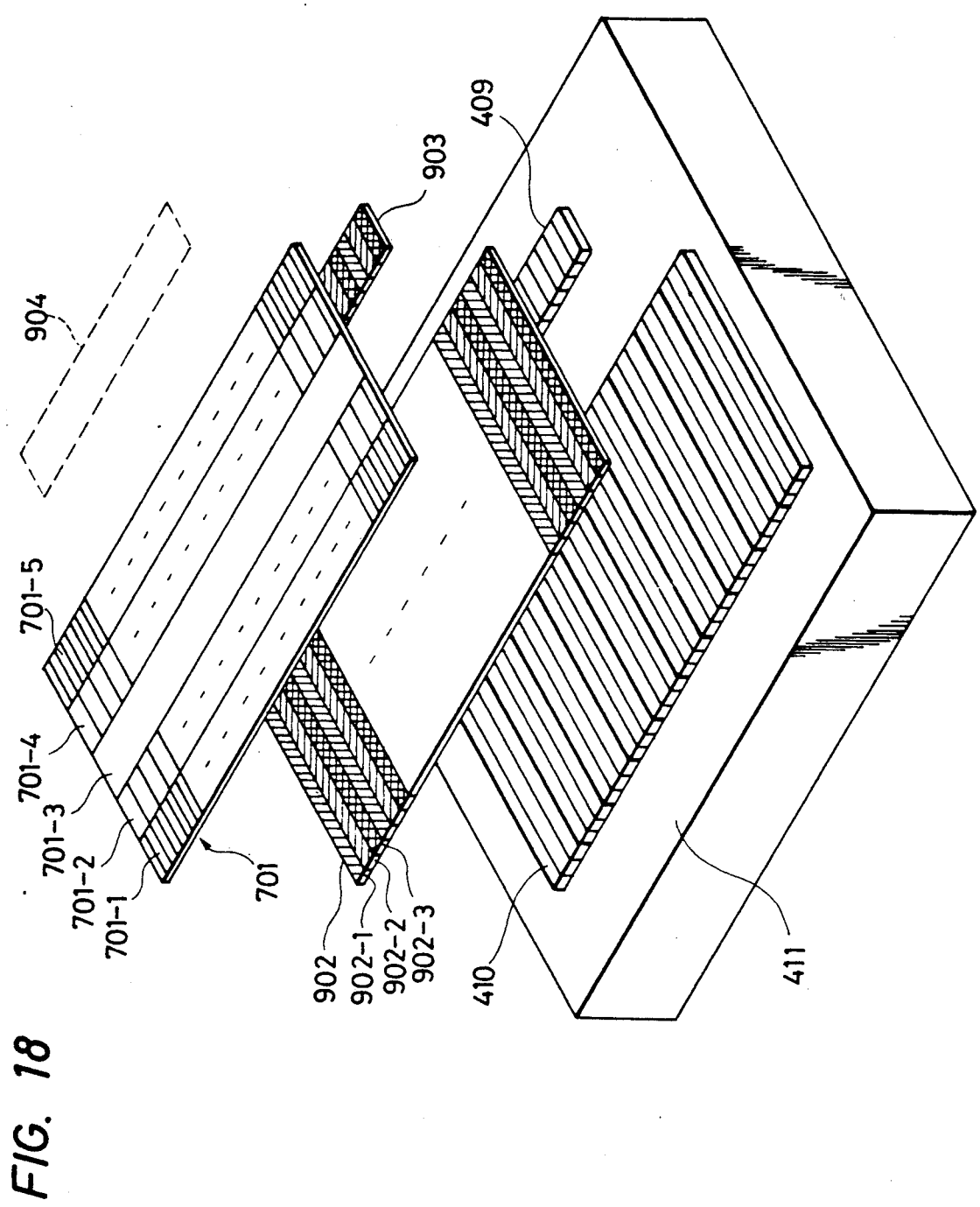
FIG. 18 is an exploded perspective view showing the positional relationship between sensor and filter.

FIG. 18 shows a more detailed arrangement, in which, as illustrated, a color separation filter 902 and a variable transmission density filter 701 are piled on the unsharp mask signal forming sensor array 410 formed on a same substrate 411. A color separation filter 903 is mounted on the photosensor array 409 formed on said substrate 411, and a neutral density (ND) filter 904 is mounted thereon if necessary. Said ND 904 regulates the amount of incident light for adjusting the sensitivity of the photosensor array 409, 410. The illustrated variable transmission density filter 701 has a uniform density in the longitudinal direction or in the y-axis direction but has varying transmission densities in the transverse direction or in the x-axis direction. 902-1, 902-2 and 902-3 respectively indicate red, green and blue filters for color separation.

Figure 19:
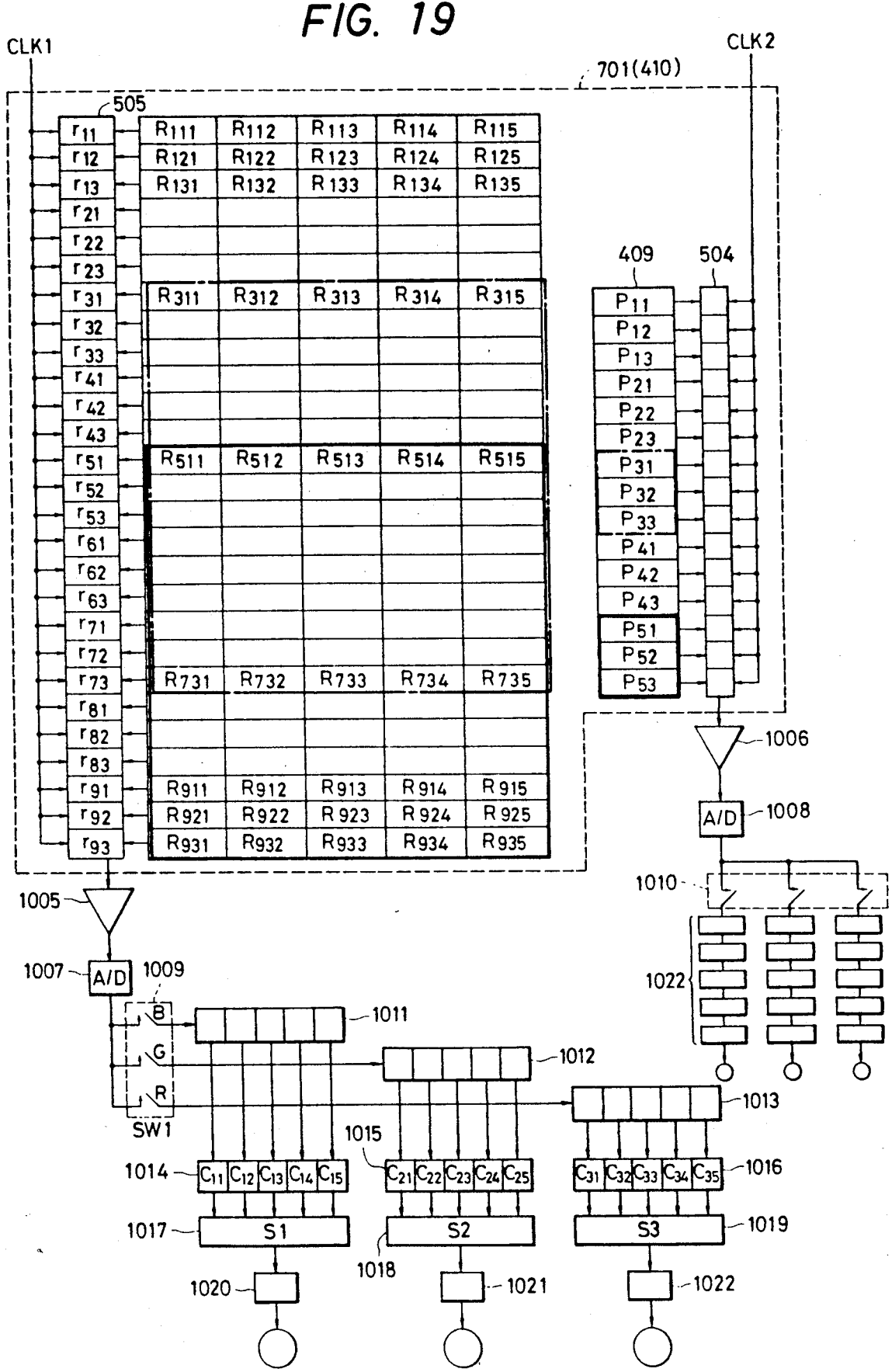
FIG. 19 is a block diagram showing an embodiment of the circuit to be connected to the sensor.

FIG. 19 shows an embodiment of a peripheral circuit for forming the image signals and unsharp mask signals by processing the output signals from the shift registers 504, 505. The shift register 504 is used for releasing the output signals of the photosensor array 409. Also, the shift register 505 is used for releasing the signals from the unsharp mask signal forming photosensor array 410, after one-dimensional filtering with the variable transmission density filter 701. A video amplifier 1005 amplifies the serial video analog signal from said shift register 505, and a video amplifier 1006 amplifies, in a similar manner, the serial analog video signal from the shift register 504. An A/D converter 1007 converts the analog video signal amplified in said video amplifier 1005 into a digital video signal, while an A/D converter 1008 converts the analog video signal amplified in said video amplifier 1006 into a digital video signal.

Digital switches 1009, are used for obtaining output signals classified into red, green and blue. The digital signals continuously released from the A/D converters 1007, 10 are cyclically repeated in the order of blue, green and red and are divided into respective colors b digital switches 1009, 1010, since the formation image signals and of unsharp mask signals has to be effected for respective colors.

There are provided 5-bit shift registers 1011–1013 for respective colors, in which the shift register 1011 receives 5 bits of video signals from a blue contact of the digital switch 1009, while the shift register 1012 receives 5 bits of green video signals from a green contact of digital switch 1009, and the shift register 1013 receives 5 bits of red video signals from a red contact of the digital switch 1009. Upon receipt of video signals in excess of 5 bits, the older data are cancelled by serial shifting, and the data remaining in the shift register are released therefrom in parallel manner.

Conversion tables 1014–1016 accessible by the parallel output signals of the corresponding shift registers 1011–1013 are composed of random access memories (RAM), programmable read-only memories (PROM) or read-only memories (ROM). In response to parallel input signals, said conversion tables 1014–1016 supply corresponding adders with data equal to the products of the parallel signals with the one-dimensional filtering coefficients along the y-axis (C) shown in FIG. 15. C11–C15 of the conversion table 1014, C21–C25 of the conversion table 1015 and C31–C35 of the conversion table 1016 are unit conversion tables storing the products of the input signals and the one-dimensional filtering coefficients along the i-direction of $R_{ijk}$, wherein j and i of $C_{ij}$ respectively indicate the color and the number of element of the photosensor array 410. In this manner the conversion tables are prepared for respective colors and photosensor elements.

The adders 1017–1019 form the sums of five data respectively received from the conversion tables 1014–1016, and dividing conversion tables 1020–1022 provide average values corresponding to the data entered from the adders 1017–1019. Each of said conversion tables 1020–1022 performs multiplication with a value 1/25, in the theory, in case of forming the unsharp mask signal with a matrix of 5×5 pixels, but, in practice, said value is not necessarily equal to 1/25 because of a possible difference in the sensitivities of the photosensor arrays 409, 410 and a possible difference in the factors of amplification of the video amplifiers 1005, 1006. Said conversion tables 1020–1022 provide the summed data multiplied by coefficients suitably selected through comparison of the unsharp mask signals and image signals for different colors.

Figure 20:
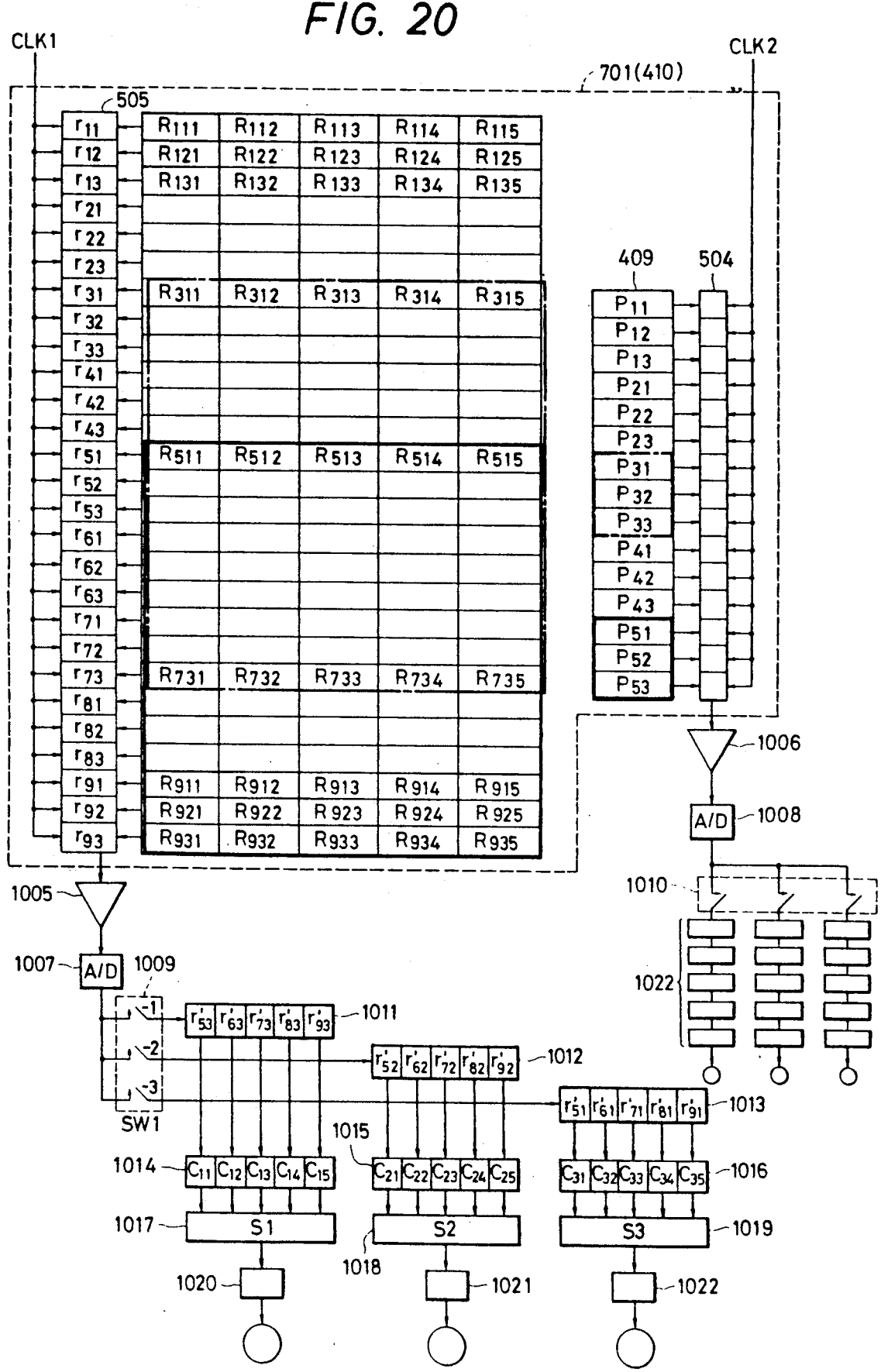
FIGS. 20 and 21 are charts showing the function of the circuit shown in FIG. 19 in obtaining the unsharp mask signals.

Now reference is made to FIG. 20 for explaining the function of the above-described apparatus in the case of preparing the unsharp mask signals corresponding to the pixels P51–P53.

When the light reflected by the original image is focused on the photosensor arrays 409, 410, the unsharp mask signal forming photosensor array 410 provides the shift register 505 with data $y_i$ represented by equation (3):

$$y_i = \sum_{j=1}^{5} D_{ij} \times E_j \qquad (3)$$

wherein:
$D_{ij}$: transmittance of filters 701, 902 including the color separation filters;
$E_j$: intensity distribution of the incident light in the longitudinal direction (the x-axis direction) of elongated sensor elements in the photosensor array 410;
i : position in the shift register 505; and
j : position in the longitudial direction (the x-axis direction) of the elongated sensor element The data $y_i$ stored in the shift register 505 are read in response to clock signals CLK 1, amplified in the video amplifier 1005, then converted into digital signals by the A/D converter 1007, separated into respective colors by the digital switch 1009 and stored in respectively corresponding shift registers 1011–1013.

In this manner, at a 15th clock signal CLK1, the data $r_{51}$–$r_{93}$ which have been stored in the shift register 505 are transferred, as corresponding data $r_{51}'$–$r_{93}'$, in the shift registers 1011–1013 as shown in FIG. 20. Said data $R_{51}'$–$r_{93}'$ in the shift registers 1011–1013 are respectively converted into data $C_{ij} \times y_i$ by the conversion tables 1014–1016. Consequently the outputs Si of the adders 1017–1019 are given by an equation (4):

$$S_i = \sum_{j=1}^{5} C_{ij} \times y_i \qquad (4)$$

Using the foregoing equation (3), the equation (4) can be written as (5):

$$S_i = \sum_{j=1}^{5} \left[ C_{ij} \times \left( \sum_{j=1}^{5} D_{ij} \times E_j \right) \right] \qquad (5)$$

Said equation (5) coincides with the foregoing equation (1) except the coefficients. Consequently the output signals obtained from the dividing conversion tables 1020–1022 are unsharp mask signals corresponding to the pixels P51–P53.

Figure 21:
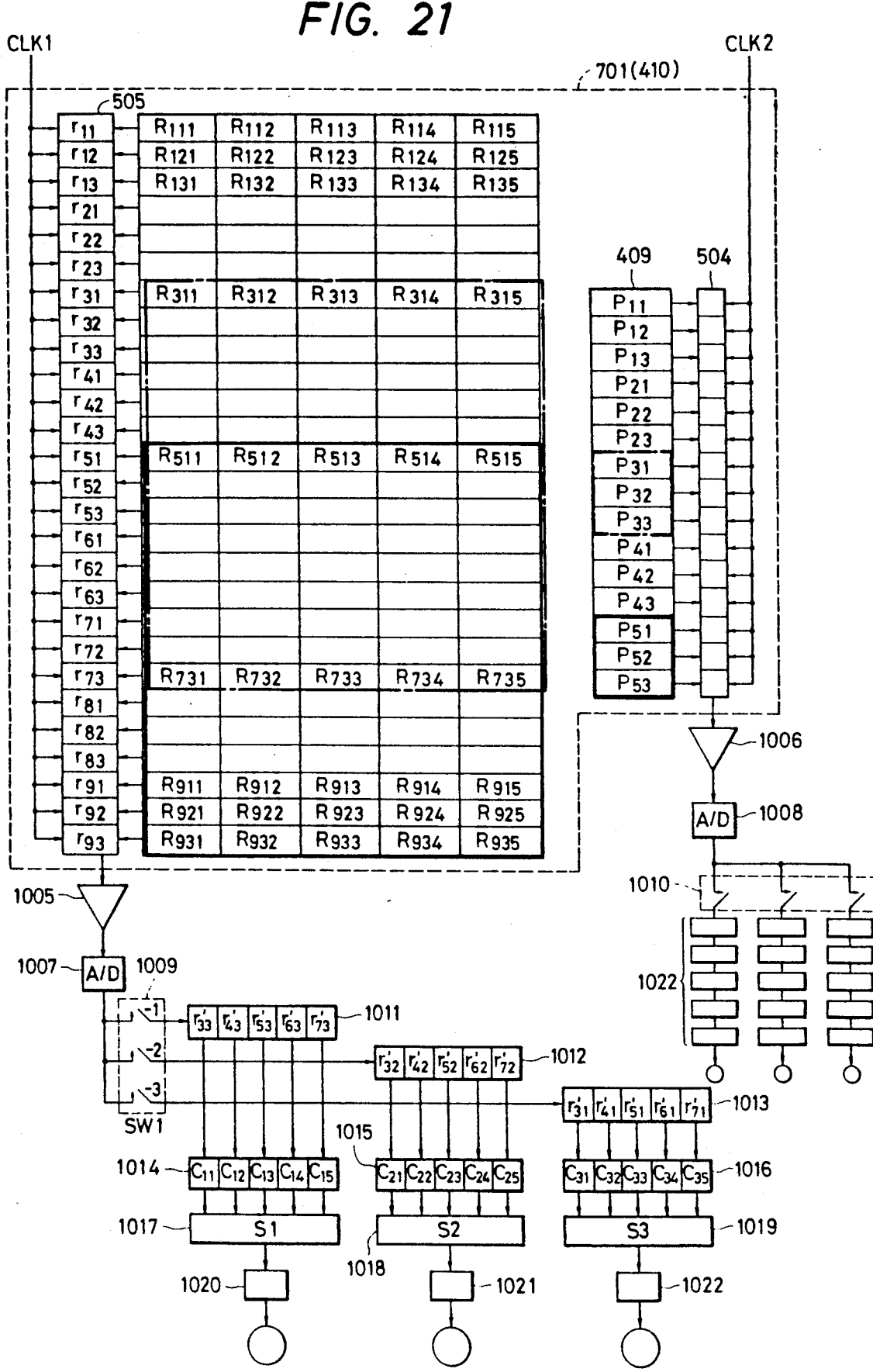

FIG. 21 shows the function in case of obtaining the unsharp mask signals corresponding to the pixels P31–P33. In this case the data $r_{31}$–$r_{73}$ in the shift register 505 are transferred, in response to the clock signals CLK1, to the shift registers 1011–1013 in the form of data $r_{31}'$–$r_{73}'$, whereby the conversion tables 1020–1022 provide unsharp mask signals corresponding to the pixels P31–P33.

As will be apparent from the foregoing explanation, the unsharp mask signal corresponding to the image signal of each color is released at a high speed on real-time basis, in synchronization with the clock signals CLK1. The data processing accomplished with an optical filtering (701) and an electric filtering with the conversion tables (1014–1016) allows the use of a simple and inexpensive circuit, without complicated circuits for summation-multiplications.

The formation of an unsharp mask signal with a matrix of 5×5 pixels involves a delay of 5 pixels. Consequently the image signal and the corresponding unsharp mask signal can be obtained simultaneously by delaying the image signal by 5 pixels in the shift register 504.

There can also be employed an optical system as shown in FIG. 13 (B). In this case, if each photosensor element in the photosensor array 410 has a length of ca. 1mm, a single imaging lens 405 can focus the optical image onto the photosensor arrays 409, 410 since the distance of image reading positions for said arrays can be in the order of 1 mm. However, since said photosensor arrays 409, 410 do not receive the images of a same point in the original, there will be required a buffer memory for obtaining the unsharp mask signal corresponding to the image on the photosensor array 409, simultaneously with the image signal. Such timing control can be easily achieved with known technology.

In the foregoing embodiment there are employed a variable transmission density filter and a color separating filter in mutually superposed arrangement, but it is also possible to mount a single filter, containing red, green and blue colors and showing a change in density, on the photosensor array for forming the unsharp mask signal.

As explained in the foregoing, the use of an unsharp mask signal forming photosensor array, which is separate from the imaging photosensor array and is larger in the light-receiving area than the latter, allows to dispense with the buffer memory for storing the image signals for the purpose of forming the unsharp mask signals, thus eliminating the scanning operation of the sensor array for signal supply to said buffer memory and thus enabling an easier control. The absence of the buffer memory eliminates the access operation to said buffer memory, thus enabling to continuously supply the image data for forming the unsharp mask signals to succeeding circuits and to achieve an extremely fast data processing.

Also the use of one-dimensional optical filtering limits the electrical filtering to other direction, thus significantly reducing the time loss in the data processing. Consequently the image signals and the corresponding unsharp mask signals can be simultaneously obtained at a high speed and with a simple circuit structure even when a photosensor array such as a CCD is employed.

The present invention has been explained by certain preferred embodiments thereof, but it is subject to various alterations and modifications within the scope of the appended claims.

I claim:

1. An image reading apparatus comprising:
   a first linear sensor, composed of a plurality of first photosensor elements arranged in a line configuration in a first direction, for reading an image line by line;
   a second linear sensor, composed of a plurality of second photosensor elements arranged in a line configuration in the first direction, for reading an image within a strip configuration of an area including a line of an image read by said first linear sensor, the number of said second photosensor elements being larger than the number of said first photosensor elements, and each of said second photosensor elements having its length extending in a second direction perpendicular to the first direction, the length of said second photosensor elements being greater than that of said first photosensor elements;
   calculating means for calculating image signals outputted from said second linear sensor to form unsharp image signals associated with image signals outputted from said first linear sensor; and
   processing means for processing the image signals outputted from said first linear sensor in accordance with the unsharp image signals formed by said calculating means.

2. An image reading apparatus according to claim 1, further comprising means for mutually correlating outputs from said first and second linear sensors.

3. An image reading apparatus according to claim 1, wherein said calculating means forms the unsharp image signals by calculating outputs of a predetermined number of consecutively-arranged ones of said second photosensor elements.

4. An image reading apparatus according to claim 1, wherein said first and second linear sensors are arranged to operate simultaneously.

5. An image reading apparatus according to claim 1, further comprising optical system means for focusing an optical image of an original on said first and second linear sensors.

6. An image reading apparatus according to claim 1, wherein said processing means is adapted to discriminate the content of the image read by said first linear sensor in accordance with the unsharp image signals formed by said calculating means.

7. An image reading apparatus comprising:
   a first linear sensor, composed of a plurality of first photosensor elements arranged in a line configuration in a first direction, for reading an image line by line;
   a second linear sensor, composed of a plurality of second photosensor elements arranged in a line configuration in the first direction, for reading an image within a strip configuration of an area including a line of an image read by said first linear sensor, the number of said second photosensor elements being larger than the number of said first photosensor elements, and each of said second photosensor elements having its length extending in a second direction perpendicular to the first direction, the length of said second photosensor elements being greater than that of said first photosensor elements;
   discriminating means for discriminating the content of the image read by said first linear sensor based on image signals outputted from said second linear sensor; and
   processing means for processing image signals outputted from said first linear sensor in accordance with a discrimination result of said discriminating means.

8. An image reading apparatus according to claim 7, further comprising means for correlating outputs from said first and second linear sensors.

9. An image reading apparatus according to claim 7, further comprising means for focusing an optical image of an original on said first and second linear sensors.

10. An image reading apparatus according to claim 7, wherein said first and second linear sensors are provided with color filters of mutually different colors for color separation.

11. An image reading apparatus according to claim 7, wherein said discriminating means includes calculating means for calculating the image signals outputted from said second linear sensor to form unsharp image signals.

12. An image reading apparatus according to claim 7, wherein each of said second photosensor elements is provided with an optical filter having a transmission density which depends upon the location thereof along said second direction.

13. An image reading apparatus comprising:

a first linear sensor, composed of a plurality of first photosensor elements arranged in a line configuration in a first direction and cyclically provided with mutually different colors of filters, for reading a color image line by line;

a second linear sensor, composed of a plurality of second photosensor elements arranged in a line configuration in said first direction and cyclically provided with mutually different colors of filters, for reading a color image within a strip configuration of an area including a line of a color image read by said first linear sensor, the number of said second photosensor elements being larger than the number of said first photosensor elements, and each of said second photosensor elements having its length extending in a second direction perpendicular to the first direction, the length of said second photosensor elements being greater than that of said first photosensor elements; and calculating means for calculating color image signals outputted from said second linear sensor on each of said filters to form unsharp color image signals associated with color image signals outputted from said first linear sensor on each of said filters.

14. An image reading apparatus according to claim 13, further comprising means for correlating outputs from said first and second linear sensors.

15. An image reading apparatus according to claim 13, further comprising optical system means for focusing an optical image of an original on said first and second linear sensors.

16. An image reading apparatus according to claim 13, further comprising means for forming an unsharp image signal by processing outputs of a predetermined number of consecutively-arranged ones of said second photosensor elements.

17. An image reading apparatus according to claim 1, wherein said first and second linear sensors are provided on a single substrate.

18. An image reading apparatus according to claim 1, wherein said first photosensor elements are arranged at a predetermined pitch, and wherein said second photosensor elements are arranged with the same pitch as that of said first photosensor elements.

19. An image reading apparatus according to claim 1, wherein each of said second photosensor elements is provided with an optical filter having a transmission density which depends upon the location thereof along the second direction.

20. An image reading apparatus according to claim 1, wherein said first photosensor elements are cyclically provided with mutually different colors of filters, and wherein said second photosensor elements are cyclically provided with mutually different colors of filters.

21. An image reading apparatus according to claim 7, wherein said first and second linear sensors are provided on a single substrate.

22. An image reading apparatus according to claim 7, wherein said first and second linear sensors are arranged to operate simultaneously.

23. An image reading apparatus according to claim 7, wherein said first photosensor elements are arranged at a predetermined pitch, and wherein said second photosensor elements are arranged with the same pitch as that of said first photosensor elements.

24. An image reading apparatus according to claim 7, wherein said processing means provides binary encoding of the image signals, using threshold signals according to the content of the image discriminated by said discriminating means.

25. An image reading apparatus according to claim 13, wherein said first and second linear sensors are provided on a single substrate.

26. An image reading apparatus according to claim 13, wherein said first photosensor elements are arranged at a predetermined pitch, and wherein said second photosensor elements are arranged with the same pitch as that of said first photosensor elements.

27. An image reading apparatus according to claim 13, wherein each of said second photosensor elements is provided with an optical filter having a transmission density which depends upon the location thereof along the second direction.

28. An image reading apparatus according to claim 13, wherein said first and second linear sensors are arranged to operate simultaneously.

* * * * *